US008351962B2

(12) United States Patent
Tian et al.

(10) Patent No.: US 8,351,962 B2
(45) Date of Patent: Jan. 8, 2013

(54) LOGICAL PAGING AREAS

(75) Inventors: Lu Tian, Plano, TX (US); Rene Raynaud, Jouy en Josas (FR); Yong Zhao, Plano, TX (US)

(73) Assignee: Alcatel Lucent, Paris (FR)

(*) Notice: Subject to any disclaimer, the term of this patent is extended or adjusted under 35 U.S.C. 154(b) by 814 days.

(21) Appl. No.: 12/101,679

(22) Filed: Apr. 11, 2008

(65) Prior Publication Data

US 2008/0261629 A1 Oct. 23, 2008

Related U.S. Application Data

(60) Provisional application No. 60/912,758, filed on Apr. 19, 2007, provisional application No. 60/913,604, filed on Apr. 24, 2007.

(51) Int. Cl.
*H04W 68/02* (2009.01)
*H04W 4/00* (2009.01)

(52) U.S. Cl. ......................... 455/458; 455/433
(58) Field of Classification Search .................. 455/458, 455/433, 456.1
See application file for complete search history.

(56) References Cited

U.S. PATENT DOCUMENTS

| 5,369,681 A | 11/1994 | Boudreau et al. |
| 6,408,182 B1 * | 6/2002 | Davidson et al. ............. 455/433 |
| 2001/0049282 A1 * | 12/2001 | Ushiki et al. .................. 455/422 |
| 2002/0187793 A1 | 12/2002 | Papadimitriou et al. |
| 2003/0027572 A1 * | 2/2003 | Karlsson et al. .............. 455/433 |
| 2004/0102199 A1 * | 5/2004 | Haumont ....................... 455/458 |
| 2004/0203756 A1 * | 10/2004 | Lin et al. ....................... 455/433 |
| 2005/0192005 A1 | 9/2005 | Blom et al. |
| 2005/0261005 A1 * | 11/2005 | Hu ............................. 455/456.1 |
| 2007/0091877 A1 * | 4/2007 | Lundin et al. ................. 370/353 |
| 2007/0281686 A1 * | 12/2007 | Liu et al. ....................... 455/433 |
| 2008/0004014 A1 * | 1/2008 | Palviainen ................. 455/435.1 |

FOREIGN PATENT DOCUMENTS

| EP | 1229749 A1 * | 8/2002 |
| EP | 1699255 A | 9/2006 |
| WO | 9724898 A | 7/1997 |

OTHER PUBLICATIONS

3GPP TSG-CN Meeting #23, Revision 2, Version 6.4.0, Title: "Addition of IMEISV to Update Location Procedure for ADD function", Source: Ericsson L.M., Telefonica, Date: Feb. 3, 2004, pp. 1-11.*

(Continued)

*Primary Examiner* — Meless N Zewdu
*Assistant Examiner* — Tangela T. Chambers
(74) *Attorney, Agent, or Firm* — Garlick & Markison; Holly L. Rudnick

(57) ABSTRACT

Paging of a mobile device within a mobile pool area serviced by two or more mobile switching nodes is reduced using logical paging areas. The mobile pool area includes a plurality of location areas, each serviced by the two or more switching nodes. In addition, the mobile pool area is divided into multiple logical paging areas, in which each logical paging area includes at least two location areas. Upon receiving a mobile terminated call for the mobile device, if the location area of the mobile device is unknown, the logical paging area within which the mobile device is located is determined in order to page the mobile device and deliver the mobile terminated call to the mobile device.

13 Claims, 5 Drawing Sheets

OTHER PUBLICATIONS

ETSI Standards, LIS, Sophia Antipolis Cedex, France, "Digital cellular telecommunications system (Phase 2+); Universal Mobile Telecommunications System (UMTS); Intra-domain connection of Radio Access Network (RAN) nodes to multiple Core Network (CN) nodes (3GPP TS 23.236 version 6.3.0 Release 6); ETSI TS 123 236"; vol. 3-SA2, No. V6.3.0; Mar. 1, 2006; XP014034212.

International Search Report and Written Opinion mailed Oct. 1, 2008.

* cited by examiner

LOGICAL PAGING AREAS

CROSS-REFERENCE TO RELATED APPLICATIONS

This U.S. Nonprovisional Application for Patent claims the benefit of the filing dates of U.S. Provisional Patent Application entitled, LOGICAL MSC PAGING, having Ser. No. 60/912,758, filed on Apr. 19, 2007 and U.S. Provisional Patent Application entitled, RECOVERY PROCEDURES Iu/A FLEX, having Ser. No. 60/913,604, filed on Apr. 24, 2007, both of which are incorporated herein by reference for all purposes.

BACKGROUND OF THE INVENTION

1. Technical Field of the Invention

The present invention relates in general to wireless communication systems, and in particular, to paging mobile terminals within wireless communication systems.

2. Description of Related Art

Today's wireless telecommunications networks provide telephone subscribers with the ability to access telecommunications services from almost anywhere in the world. The key to facilitating such world-wide access is mobility management. With mobility management, wireless networks are able to track the location of mobile subscribers so that mobile services can be delivered to them.

A wireless network is typically formed of a number of cells, each covering a small geographic area within which a mobile device, such as a mobile station, may receive mobile services. Each cell is equipped with a base station that provides radio coverage to the cell, thereby enabling communication with mobile devices located within the cell. By integrating the coverage of multiple base stations, a wireless network is able to provide radio coverage to mobile subscribers over a large geographic area.

A traditional wireless network 10*a* is illustrated in FIG. 1. The coverage area of a collection of neighboring base stations is commonly referred to as a location area (LA) 70. Each LA 70 (i.e., LA1-LA5) is served by a Radio Access Node (RAN) 50 (i.e., RAN1-RAN5) and a mobile switching center/visitor location register (MSC/VLR) 30 (i.e., MSC/VLR1 and MSC/VLR2) via a respective connectivity network 40*a* and 40*b*. In addition, each MSC/VLR 30 may serve multiple LAs 70, which together form an MSC coverage area 60. For example, LA1-LA3 form MSC1 coverage area that is served by MSC/VLR1, while LA4 and LA5 form MSC2 coverage area that is served by MSC/VLR2.

The MSC/VLR 30 is the network node that provides circuit-switched calling, mobility management and other telecommunications/mobile services to mobile subscribers. In particular, the MSC/VLR 30 maintains subscriber data for all mobile subscribers that are currently located within one of the location areas 70 served by the MSC/VLR 30. For example, the subscriber data for each mobile subscriber typically includes the location area and serving base station of the mobile subscriber, which allows the MSC/VLR 30 to page, communicate with and connect incoming calls to that mobile subscriber.

When a mobile subscriber moves or "roams" into a new location area 70 (e.g., from LA1 to LA2), the mobile device must inform the wireless network of the change in location area by performing what is commonly referred to as a location update procedure. Each mobile device is responsible for maintaining the location area code (LAC) of the current location area and comparing the stored LAC with subsequent LAC's that are broadcast and received by the mobile device. If the mobile device finds that the received LAC is different from the stored LAC, the mobile device sends a location update request to the wireless network.

If the new location area is served by a different MSC/VLR than the previous location area, an inter-VLR location update is performed. For example, if the mobile device roams from LA3, which is served by MSC/VLR1 into LA4, which is served by MSC/VLR2, an inter-VLR location update is performed. During the inter-VLR location update, the new MSC/VLR that receives the location update request from the mobile subscriber transmits an update location message to the Home Location Register (HLR) 20 of the mobile subscriber. The HLR 20 is a database that maintains permanent subscriber records for mobile subscribers. Upon receiving the update location message, the HLR 20 forwards the subscriber data associated with the mobile subscriber to the new MSC/VLR (i.e., MSC/VLR2) for temporary storage in the new MSC/VLR while the mobile subscriber is within the MSC/VLR coverage area and updates its records to indicate that the mobile subscriber is now present in a location area served by the new MSC/VLR. In addition, the HLR 20 asks the old MSC/VLR (i.e., MSC/VLR1) to delete its subscriber record for this mobile subscriber since the mobile subscriber is no longer located in a location area served by the old MSC/VLR.

Once the location update procedure is complete, the mobile subscriber can continue to receive mobile services through the new MSC/VLR (i.e., MSC/VLR2). For example, in a typical mobile terminated call scenario, an incoming call to the mobile subscriber is first routed to a gateway mobile switching center (GMSC). Upon receiving the mobile terminated call, the GMSC queries the HLR to determine the current location of the mobile subscriber. For example, the HLR typically requests routing information from MSC/VLR and returns it to the GMSC. The GMSC uses the routing information to route the mobile terminated call to the MSC/VLR. The MSC/VLR accesses its subscriber data for the mobile subscriber to determine the location area of the mobile subscriber, and pages the mobile device of the mobile subscriber within that location area to set-up a call connection to the mobile device for the mobile terminated call.

However, if the MSC/VLR crashes, the MSC/VLR goes through a restart routine in which all temporary subscriber records are deleted. During the restart routine (or when the MSC/VLR is in the maintenance stage), subscribers cannot make or receive new calls through the MSC/VLR. To prevent such a loss of service, service providers have begun implementing flexible wireless network architectures. An example of a flexible wireless network 10*b* is shown in FIG. 2. In the flexible wireless network 10*b*, multiple MSC/VLRs 30 (i.e., MSC/VLR1 and MSC/VLR2) service a large mobile pool area 80 that is made up of multiple location areas 70 (i.e., LA1-LA5). Each MSC/VLR 30 is able to serve mobile subscribers within any of the location areas 70. A mobile subscriber located in the mobile pool area is registered and served in any one of the MSC/VLRs 30.

However, in the flexible architecture, when one MSC/VLR goes down, another MSC/VLR can take over while the failed MSC/VLR restarts. For example, if a mobile subscriber within LA2 receives a mobile terminated call during the time that the serving MSC/VLR (i.e., MSC/VLR1) is restarting, the mobile terminated call can be routed to MSC/VLR2 for connection of the mobile terminated call to the mobile subscriber. In this case, when the HLR requests the routing information for the mobile terminated call that identifies MSC/VLR1 as the serving MSC/VLR from the HLR 20, a Signal Transfer Point (STP) (within the SS7 network) can forward the request to MSC/VLR2. However, since the LAC of the LA that the mobile subscriber is currently located in is only stored in the serving MSC/VLR, here MSC/VLR1, MSC/VLR2 will not have knowledge of the current location area (LA2) of the mobile subscriber. Therefore, in order to connect the mobile terminated call to the mobile subscriber, MSC/VLR2 must page the mobile subscriber over the entire mobile pool area 80, a procedure commonly referred to as global paging.

Unfortunately, global paging causes excessive traffic throughout the mobile pool area. Therefore, what is needed is a paging solution in flexible wireless network that reduces the traffic within the mobile pool area.

SUMMARY OF THE INVENTION

Embodiments of the present invention provide a method and apparatus for paging a mobile device within a mobile pool area serviced by two or more mobile switching nodes. The mobile pool area includes a plurality of location areas, and is divided into multiple logical paging areas. Upon receiving a mobile terminated call for the mobile device, the logical paging area within which to page the mobile device is determined in order to deliver the mobile terminated call to the mobile device.

In one embodiment, the mobile switching nodes are mobile switching center/visitor location registers (MSC/VLRs). In another embodiment, the mobile switching nodes are serving general packet radio service nodes (SGSNs). For example, the mobile device can be paged within said logical paging area by one of said MSC/VLRs or one of the SGSNs when the mobile terminated call is received after a restart of one of the MSC/VLRs or SGSNs.

In an exemplary embodiment, each logical paging area is associated with a logical MSC/VLR address identifying one of the MSC/VLRs. The logical MSC/VLR address is received with the mobile terminated call, and used to derive said logical paging area within which to page the mobile device. For example, in one embodiment, the logical MSC/VLR address is received within a Mobile Application Part (MAP) Provide Roaming Number message from a Home Location Register (HLR) associated with the mobile device. The logical MSC/VLR address is provided to the HLR within the MSC/VLR address parameter of a location update message each time the mobile device roams into a new logical paging area. In addition, if the mobile device moves to a new paging area within the same mobile pool area, and the mobile device is still served by the same MSC/VLRs, the location update message can further include a "skipSubscriberDataUpdate" parameter to prevent the HLR from downloading the subscriber data associated with the mobile device.

In another exemplary embodiment, each logical paging area has a unique paging area identity associated therewith. The paging area identity can be received, for example, within a Mobile Application Part (MAP) Provide Roaming Number message from a Home Location Register (HLR) associated with the mobile device. In addition, the update location message can include the paging area identity of the logical paging area (or the collection of location area identities (LAIs)) within which the mobile device is currently located. For example, the paging area identity can be included within a local mobile subscriber identity parameter of the update location message. In addition, if the mobile device moves to a new paging area within the same mobile pool area, and the mobile device is still served by the same MSC/VLRs, the location update message can further include a "skipSubscriberDataUpdate" parameter to prevent the HLR from downloading the subscriber data associated with the mobile device.

Embodiments of the invention are also applicable to the MSC/VR restart case where all temporary subscriber records are deleted. In this case, the logical paging area (the PAI or set of LAIs) is received.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 3:
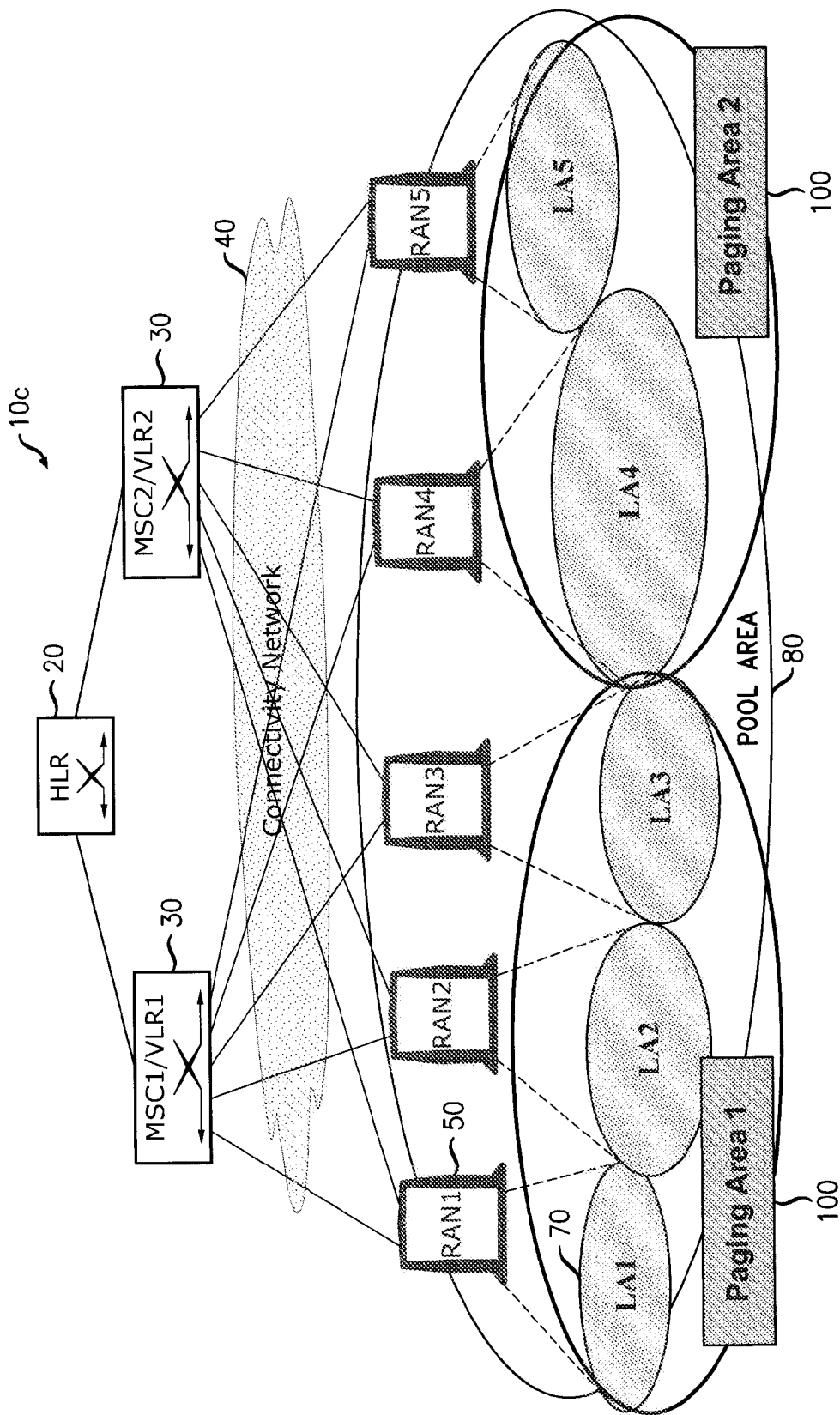
FIG. 3 illustrates an exemplary flexible wireless network utilizing logical paging areas to page mobile devices, in accordance with embodiments of the present invention.

FIG. 3 illustrates an exemplary flexible wireless network 10*c* utilizing logical paging areas to page mobile devices, in accordance with embodiments of the present invention. The flexible wireless network 10*c* includes Mobile Switching Center/Visitor Location Registers (MSC/VLR1 and MSC/VLR2) 30, Radio Access Nodes (RAN1-RAN5) 50 and a Home Location Register (HLR) 20. MSC/VLR1 and MSC/VLR2 each serve all of the location areas (LA1-LA5) 70 within the mobile pool area 80 via connectivity network 40.

Figure 1:
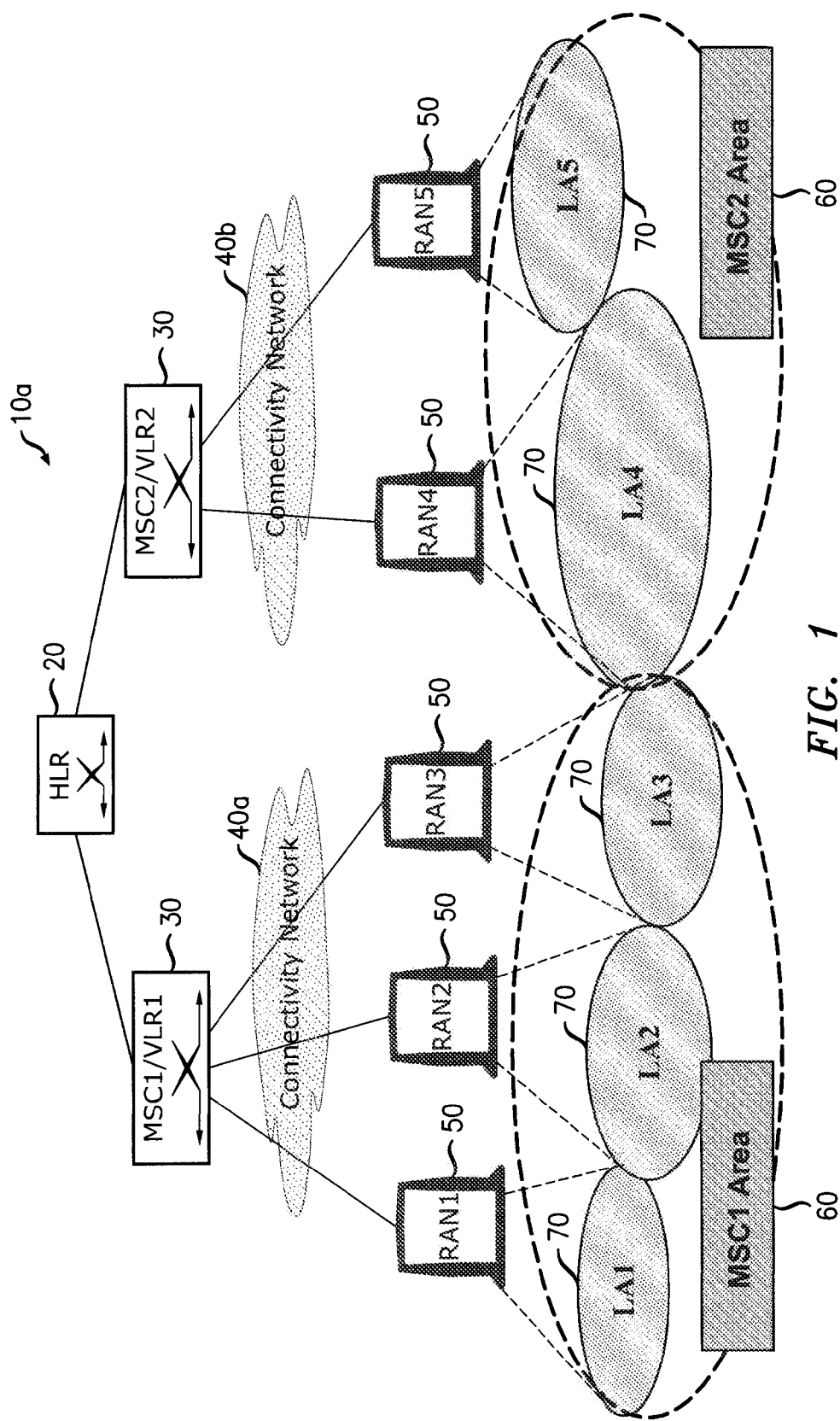
FIGS. 1 and 2 illustrate exemplary conventional traditional and flexible wireless networks.
Figure 2:
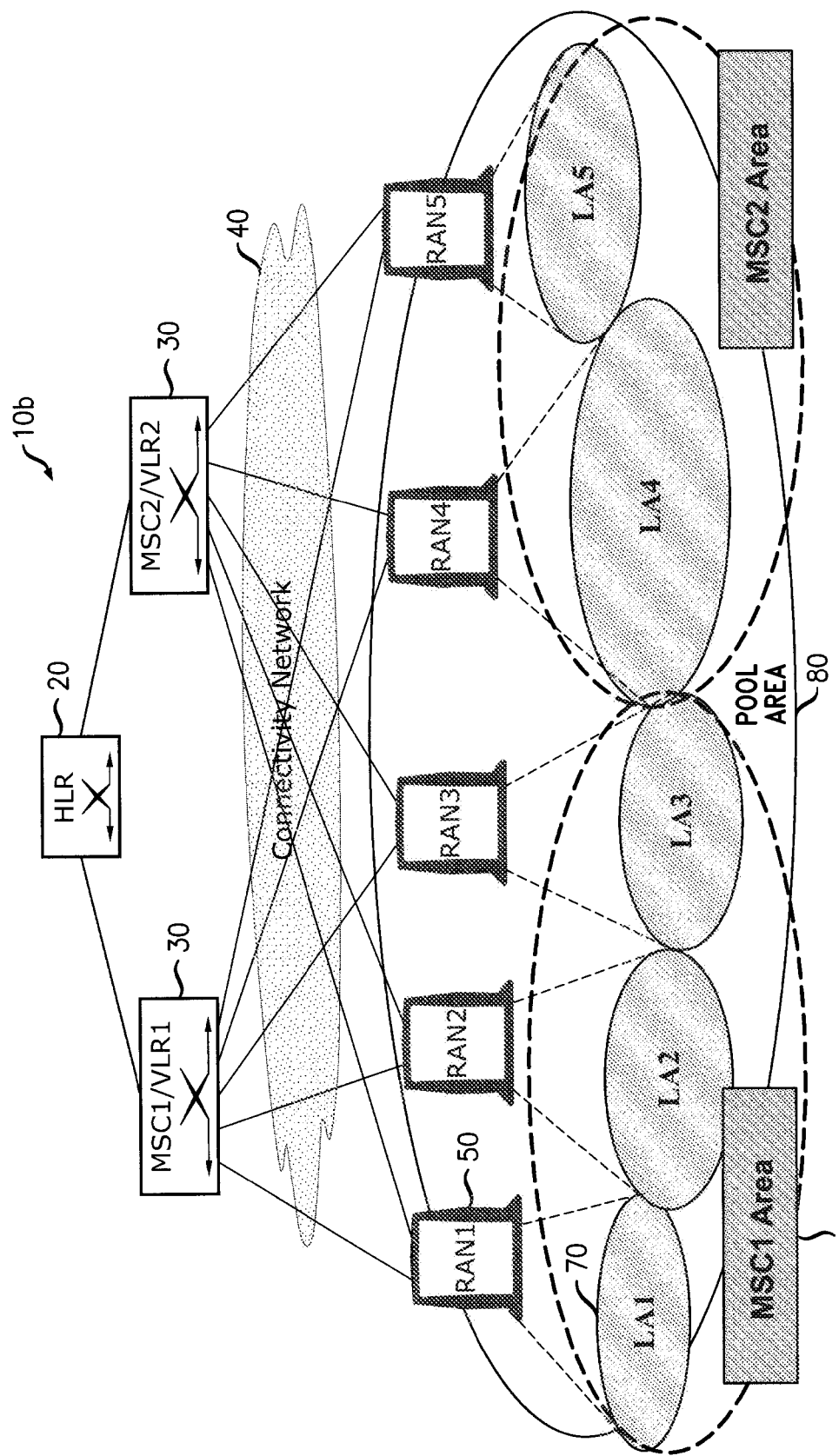

In accordance with embodiments of the present invention, the mobile pool area 80 is divided into multiple logical paging areas (Paging Area 1 and Paging Area 2) 100. The term "logical paging area" is defined herein as a collection of location areas 70 to avoid global paging throughout the mobile pool area 80. Thus, each logical paging area 100 includes two or more location areas 70, but less than all of the location areas 70, within the mobile pool area 80. In FIG. 3, the logical paging areas 100 correspond to the traditional MSC coverage areas shown in FIG. 1. However, in other embodiments, the mobile pool area 80 can be divided into other logical paging areas 100, so that each logical paging area 100 can include any number of location areas 70.

Each logical paging area 100 has a paging area identity (PAI) associated therewith that uniquely identifies the paging area 100 within the mobile pool area 80. The PAI is used to determine the logical paging area within which to page a mobile device if the current location area 70 of the mobile device is unknown. For example, if one of the MSC/VLRs goes down and deletes all of its temporary subscriber records as a result of a restart procedure, the current location area 70 of each subscriber for whom the failed MSC/VLR kept a temporary subscriber record would be unknown. In this situation, instead of performing a global paging across the entire mobile pool area 80, for a mobile terminated call, the mobile device would be paged only in the location areas 70 included within the logical paging area 100 of the mobile device.

To enable the MSC/VLR 30 to determine the current logical paging area 100 of a mobile device, a paging area indicator is stored in the HLR 20. In one embodiment, the paging area indicator is the PAI of the paging area. In another embodiment, the paging area indicator is a logical MSC address that can be used to derive the PAI of the paging area. For example, each paging area 100 can be assigned an MSC address associated with the MSC currently serving the mobile device. As an example, Paging Area 1 can be assigned the address of MSC1*a* when MSC/VLR1 is serving a mobile device in Paging Area 1 and the address MSC2*a* when MSC/VLR2 is serving a mobile device in Paging Area 1. Likewise, Paging Area 2 can be assigned the address of MSC1*b* when MSC/VLR1 is serving a mobile device in Paging Area 2 and the address of MSC2*b* when MSC/VLR2 is serving a mobile device in Paging Area 2.

During a location update, or each time a mobile device roams into a new paging area 100, the serving MSC/VLR 30 can update the HLR 20 with the MSC address for the logical paging area 100 in which the mobile device is currently located. For example, if a mobile device roams from LA3 into LA4, but is continued to be served by MSC/VLR1, MSC/VLR1 can update the HLR 20 with the new MSC address, i.e., MSC1*b*. As another example, if a mobile device roams from LA4 to LA3, but continues to be served by MSC/VLR2, MSC/VLR2 can update the HLR 20 with the new MSC address, i.e., MSC2*b*. As yet another example, if a mobile device roams from LA4 to LA3, and performs an inter-VLR location update from MSC/VLR2 to MSC/VLR1, MSC/VLR1 can update the HLR 20 with the new MSC address, i.e., MSC1*a*.

When the mobile device roams into a new paging area, but the serving MSC/VLR 30 does not change, to reduce traffic in the flexible wireless network 10*c*, the MSC/VLR 30 update location message to the HLR 20 can include a "skipSubscriberDataUpdate" parameter that informs the HLR 20 that there is no need to download the subscriber data for the mobile device to the MSC/VLR since the serving MSC/VLR has not changed. Typically, multiple insert subscriber data (ISD) messages are sent from the HLR 20 to the MSC/VLR 30 during the location update process to provide the MSC/VLR with the subscriber data associated with the mobile device. By including the "skipSubscriberDataUpdate" parameter, the HLR 20 is prevented from sending the ISD messages, which reduces the network traffic.

In embodiments where the paging area indicator is the PAI, the MSC/VLR 30 can either send the PAI within a new information element (IE) or parameter of the update location message transmitted from the MSC/VLR 30 to the HLR 20 or include the PAI within a Local Mobile Subscriber Identity (LMSI) parameter of the update location message transmitted from the MSC/VLR 30 to the HLR 20. In the former embodiment, a new IE must be added to the update location message, while in the latter embodiment, an existing IE (i.e., the LMSI) is used to transmit the PAI. However, if the LMSI is already used for the LMSI or for another purpose, the LMSI parameter cannot be used to transmit the PAI and a new IE must be added to the update location message to transmit the PAI to the HLR 20.

In an exemplary operation, when a mobile device first enters one of the location areas 70 in the mobile pool area 80, for example, LA3, the mobile device receives the location area code (LAC) of LA3 that is broadcast by RAN3 50. The mobile device then sends a location update request to the wireless network 10*c* via RAN3. Upon receiving the location update request, RAN3 forwards the location update request to one of the MSC/VLRs 30, for example, MSC/VLR1, serving the mobile pool area 80. MSC/VLR1 30 then transmits an update location message to the HLR 20 to retrieve the subscriber data associated with the mobile device and to update the HLR 20 with the paging area indicator, e.g., the PAI or MSC address, identifying Paging Area 1.

Figure 4:
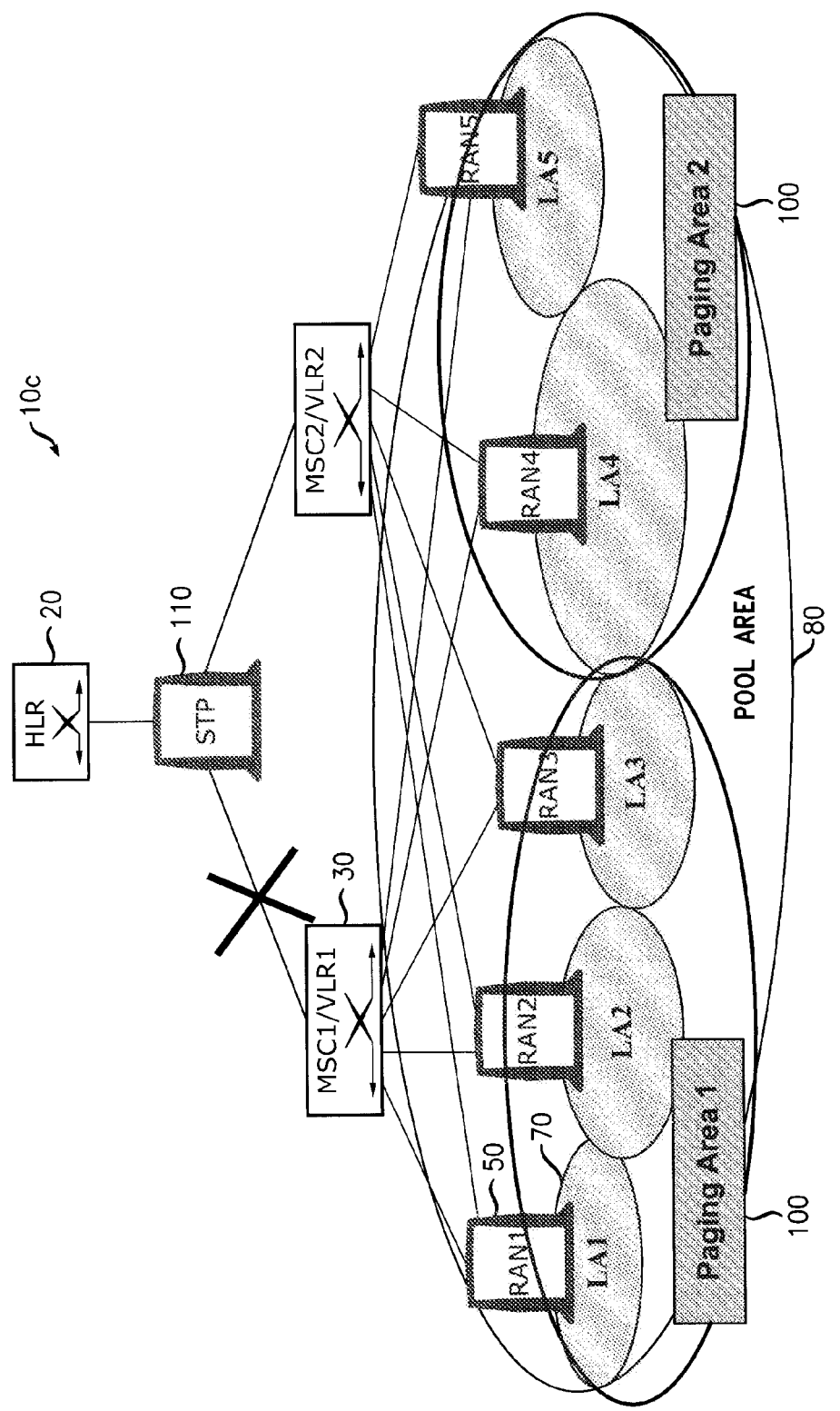
FIG. 4 illustrates an exemplary flexible wireless network for delivering a mobile terminated call to a mobile device using logical paging areas, in accordance with embodiments of the present invention.

If, during the time that MSC/VLR1 is serving the mobile device, MSC/VLR1 goes down, and a mobile terminated call comes into the flexible wireless network 10*c* during the time that MSC/VLR1 is restarting, the mobile terminated call can be routed to MSC/VLR2 for connection of the mobile terminated call to the mobile subscriber. For example, referring now to FIG. 4, when HLR 20 receives a Send Routing Information (SRI) message from a Gateway Mobile Switching Center (GMSC) (not shown), the HLR 20 accesses the subscriber record for the mobile device to determine the serving MSC/VLR, here MSC/VLR1, and transmits a Provide Roaming Number (PRN) message 310 via Signal Transfer Point (STP) 110 to MSC/VLR1. Since MSC/VLR1 is down, STP will attempt to redirect the PRN message to MSC/VLR2.

The PRN message sent to MSC/VLR2 includes the logical MSC address or paging area identity (PAI) or the collection of LAIs, so that MSC/VLR2 will be able to determine the logical paging area within which to page the mobile device. In response to the PRN message, the MSC/VLR2 sends a message including a Mobile Station Roaming Number (MSRN) back to the HLR 20 and restores the subscriber data associated with the mobile device from HLR 20. The MSRN is an E.164 number that is temporarily assigned to the mobile device for the mobile terminated call and can be used to route the mobile terminated call to MSC/VLR2. Upon receipt of the MSRN, the HLR 20 forwards the MSRN back to the GMSC, which uses the MSRN to route an Initial Address Message (IAM) for the mobile terminated call to MSC/VLR2. Upon receipt of the IAM, MSC/VLR2 uses the logical MSC address or PAI or collection of LAIs to determine the logical paging area within which to page the mobile device, and pages the mobile device within that logical paging area.

If paging is successful, MSC/VLR2 can connect the mobile terminated call to the mobile device. If paging is unsuccessful (i.e., the paging timer expires), MSC/VLR2 can page the mobile device within the entire mobile pool area 80. If the mobile device responds from a new logical paging area, MSC/VLR2 updated the HLR 20 with the new paging area indicator (MSC address or PAI).

Logical paging areas can also be used for paging reattempts if the mobile device does not respond to location area (LA) paging. For example, if MSC/VLR1 does not go down, when the mobile terminated call comes into the GMSC, the call is routed to MSC/VLR1 as conventionally done. MSC/VLR1 accesses the subscriber data for the mobile subscriber to which the mobile terminated call is addressed to retrieve the LA and logical paging area for the mobile subscriber. MSC/VLR1 first pages the mobile device within the designated LA 70, and if there is no response, MSC/VLR1 can page the mobile device within the logical paging area 100. Only if there is no response from logical paging of the mobile device will the MSC/VLR1 perform a global page throughout the entire mobile pool area 80 for the mobile device.

In another embodiment of the present invention, the logical paging areas 100 can be used within a General Packet Radio System (GPRS), in which Serving General Packet Radio Services Nodes (SGSNs) service the flexible network 10*c*. In this embodiment, the MSC/VLRs 30 are replaced with SGSN's.

Figure 5:
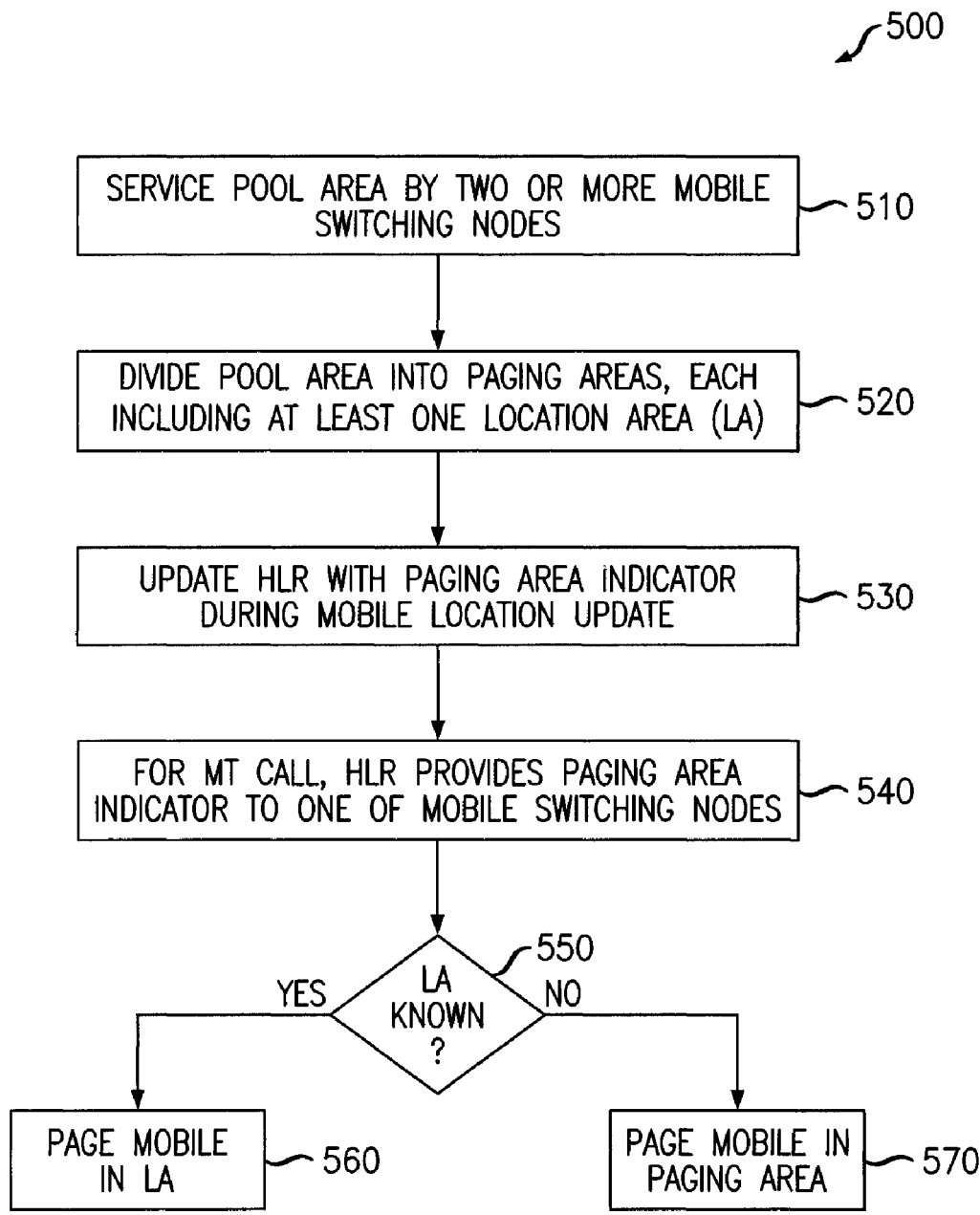
FIG. 5 is a flowchart illustrating an exemplary process for paging a mobile device using logical paging areas, according to embodiments of the present invention.

FIG. 5 is a flowchart illustrating an exemplary process 500 for paging a mobile device using logical paging areas, according to embodiments of the present invention. At block 510, two or more mobile switching nodes are provided to service a mobile pool area that includes a plurality of location areas (LAs). At block 520, the mobile pool area is divided into logical paging areas, each including at least one of the LAs. During each location update that is performed by a mobile device within the mobile pool area, at block 530, the HLR is updated with a paging area indicator that is used to uniquely identify the logical paging area within which the mobile device is currently located.

When a mobile terminated call arrives for a particular mobile device within the mobile pool area, at block 540, the HLR provides the paging area indicator of the mobile device to one of the mobile switching nodes for use by that mobile switching node in connecting the mobile terminated call to the mobile device. If, at block 550, the LA of the mobile device is known by the mobile switching node, at block 560, the mobile switching node pages the mobile device within the LA to connect the mobile terminated call to the mobile device. However, if the LA area of the mobile device is unknown (e.g., the mobile switching node lost the LA or the mobile device does not answer the page within the LA), at block 570, the mobile switching node pages the mobile device within the logical paging area provided by the HLR to connect the mobile terminated call to the mobile device.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. An apparatus for paging a mobile device within a mobile pool area serviced by two or more mobile switching nodes, said mobile pool area including a plurality of location areas, said apparatus comprising:
   means for receiving, from a Home Location Register, a paging area indicator identifying a logical paging area for paging said mobile device at a new mobile switching node of said two or more mobile switching nodes after a restart of a serving mobile switching node of said two or more mobile switching nodes serving said mobile device, said logical paging area including at least two of said location areas but less than all of said location areas within said mobile pool area, said paging area indicator being a logical mobile switching node address identifying both said serving mobile switching node and said logical paging area;
   means for receiving a mobile terminated call for said mobile device at said new mobile switching node; and
   means for paging said mobile device, by said new mobile switching node, in order to deliver said mobile terminated call to said mobile device.

2. The apparatus of claim 1, wherein said mobile switching nodes are mobile switching center/visitor location registers (MSC/VLRs).

3. The apparatus of claim 1, wherein said mobile switching nodes are serving general packet radio service nodes (SGSNs).

4. The apparatus of claim 1, wherein said means for paging includes:
   means for enabling said new mobile switching node to derive said logical paging area within which to page said mobile device from said logical mobile switching node address.

5. The apparatus of claim 4, wherein said means for receiving said paging area indicator further includes:
   means for receiving said logical mobile switching node address within a Mobile Application Part (MAP) Provide Roaming Number message from said Home Location Register (HLR) associated with said mobile device.

6. The apparatus of claim 4, wherein said mobile pool area includes a plurality of logical paging areas, each being assigned a respective logical mobile switching node address that identifies one of said mobile switching nodes.

7. The apparatus of claim 6, further comprising:
   means for sending an update location message to said Home Location Register (HLR) associated with said mobile device when said mobile device roams into a new one of said plurality of logical paging areas, said update location message including said respective logical mobile switching node address associated with said new one of said plurality of logical paging areas within a mobile switching node address parameter of said update location message.

8. The apparatus of claim 7, wherein said location update message further includes a "skipSubscriberDataUpdate" parameter to prevent said HLR from transmitting subscriber data associated with said mobile device to said apparatus when said serving mobile switching node remains the same.

9. A method for paging a mobile device within a mobile pool area serviced by two or more mobile switching nodes, said mobile pool area including a plurality of location areas, said mobile pool area being divided into logical paging areas, each including two or more of said location areas, said method comprising:
   receiving, from a home location register, a paging area indicator identifying a logical paging area for paging said mobile device at a new mobile switching node of said two or more mobile switching nodes after a restart of a serving mobile switching node of said two or more mobile switching nodes serving said mobile device, said paging area indicator being a logical mobile switching node address identifying both said serving mobile switching node and said logical paging area;
   receiving a mobile terminated call for said mobile device at said new mobile switching node; and
   paging said mobile device within said logical paging area, by said new mobile switching node, in order to deliver said mobile terminated call to said mobile device.

10. The method of claim 9, wherein said mobile switching nodes are mobile switching center/visitor location registers (MSC/VLRs), and wherein each of said logical paging areas are associated with a respective logical MSC/VLR address identifying one of said MSC/VLRs, and further comprising:
    receiving one of said logical MSC/VLR addresses for said mobile terminated call; and
    deriving said logical paging area within which to page said mobile device from said one of said logical MSC/VLR addresses.

11. The method of claim 10, wherein said receiving said one of said logical MSC/VLR addresses further includes:
    receiving said one of said logical MSC/VLR addresses within a Mobile Application Part (MAP) Provide Roaming Number message from said Home Location Register (HLR) associated with said mobile device.

12. The method of claim 10, further comprising:
    sending an update location message to said Home Location Register (HLR) associated with said mobile device when said mobile device roams into a new one of said paging areas, said update location message including said respective one of said logical MSC/VLR addresses associated with said new one of said paging areas within an MSC/VLR address parameter of said update location message.

13. The method of claim 12, wherein said update location message further includes a "skipSubscriberDataUpdate" parameter to prevent said HLR from transmitting subscriber data associated with said mobile device when said serving MSC/VLR remains the same.

* * * * *